United States Patent [19]

Weigel

[11] Patent Number: 5,074,740

[45] Date of Patent: Dec. 24, 1991

[54] VEHICLE FOR CARRYING DEBRIS BOXES

[75] Inventor: Jesse C. Weigel, Capitola, Calif.

[73] Assignee: Zanker Road Resource Management, San Jose, Calif.

[21] Appl. No.: 478,806

[22] Filed: Feb. 12, 1990

[51] Int. Cl.[5] ............ B60P 1/48

[52] U.S. Cl. ............ 414/550; 294/67.31; 294/106; 414/555

[58] Field of Search ............ 414/546, 550, 555; 294/67.31, 106

[56] References Cited

U.S. PATENT DOCUMENTS

| | | | |
|---|---|---|---|
| 2,904,370 | 9/1959 | Meinholtz et al. | 294/67.31 X |
| 3,263,834 | 8/1966 | Tendresse | 414/555 X |
| 3,601,169 | 8/1971 | Hamilton et al. | 414/555 X |
| 3,701,443 | 10/1972 | Lely | 414/546 |
| 3,899,205 | 8/1975 | Lanigan et al. | 294/67.31 |
| 3,927,778 | 12/1975 | Zrostlik | 414/555 X |
| 3,954,194 | 5/1976 | Stedman | 414/550 |
| 4,085,853 | 4/1978 | van der Lely et al. | 414/555 X |
| 4,091,943 | 5/1978 | Bay-Schmith | 414/555 X |
| 4,303,269 | 12/1981 | Faughnan | 294/67.31 X |
| 4,543,028 | 9/1985 | Bell et al. | 414/555 X |
| 4,693,017 | 9/1987 | Oehler et al. | 294/67.31 X |
| 4,703,968 | 11/1987 | LaBounty | 294/106 X |

FOREIGN PATENT DOCUMENTS

| | | | |
|---|---|---|---|
| 849906 | 8/1970 | Canada . | |
| 738923 | 6/1980 | U.S.S.R. | 414/546 |
| 1054137 | 11/1983 | U.S.S.R. | 414/546 |
| 2128168 | 4/1984 | United Kingdom | 414/546 |

*Primary Examiner*—David A. Bucci
*Attorney, Agent, or Firm*—Townsend and Towsend

[57] ABSTRACT

A vehicle having a flat bed for hauling a stack of open-top trash boxes. The vehicle also has a boom which can rotate about a vertical axis through an angle of 360°, and the boom is made up of relatively shiftable segments so that the effective reach of the boom can be changed from a minimum effective length to a maximum effective length. The outer end of the boom has a jaw structure to grasp a trash box at the center portion thereof to lift it off the bed or to place a trash box on the bed.

7 Claims, 9 Drawing Sheets

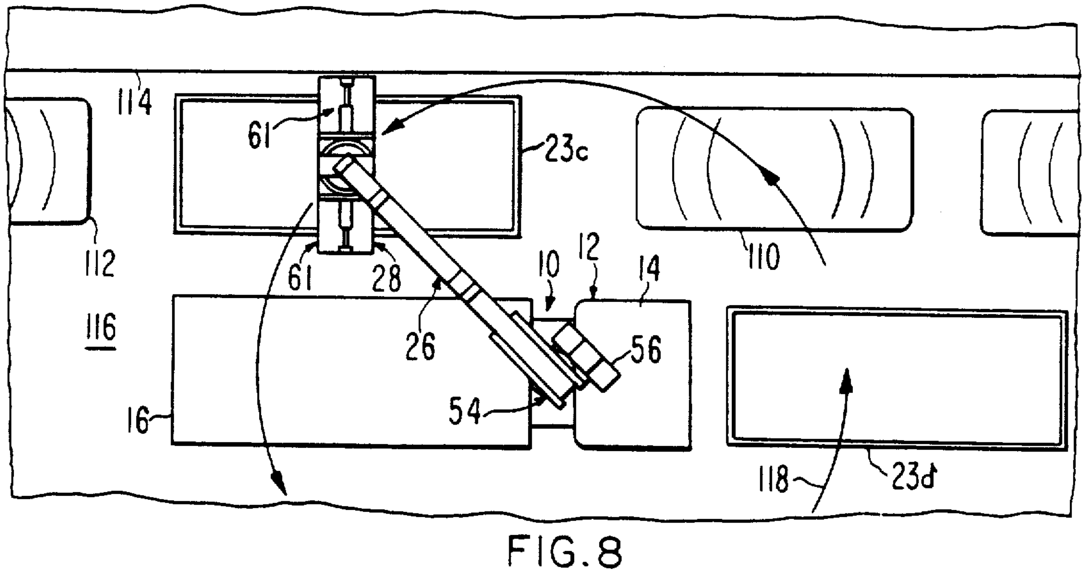
FIG.8
FIG.9
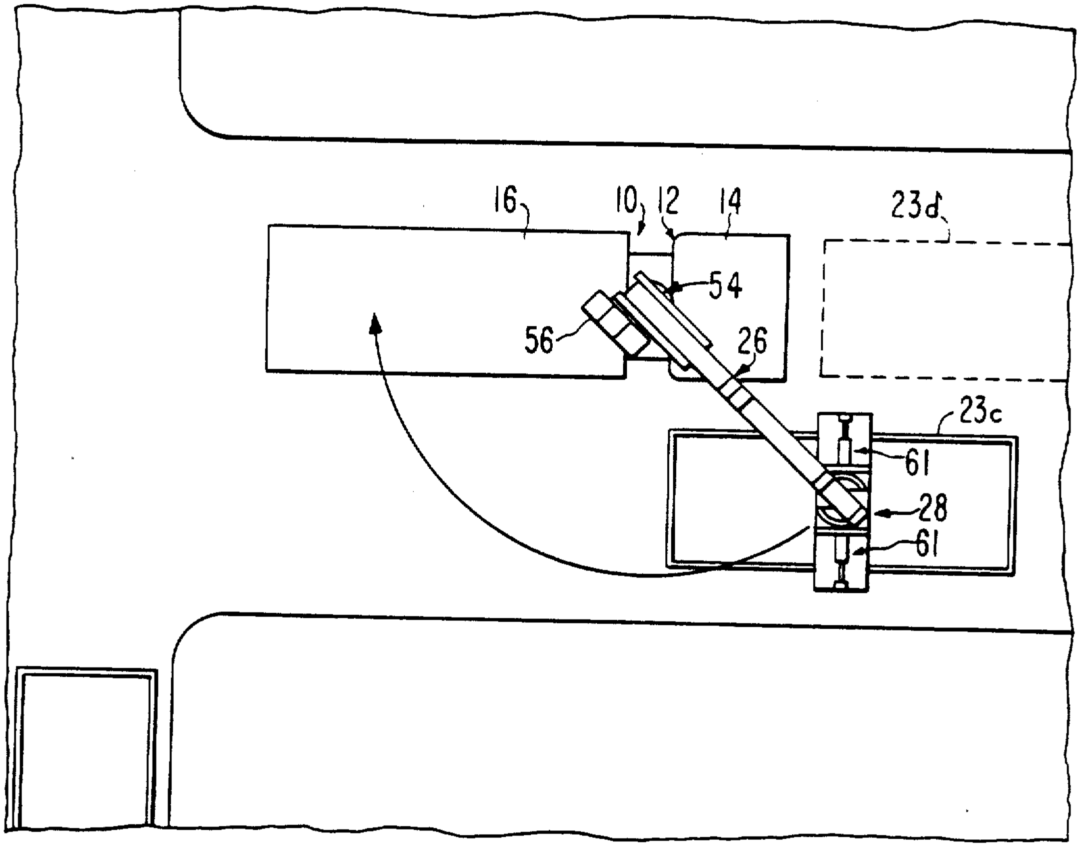

VEHICLE FOR CARRYING DEBRIS BOXES

This invention relates to improvements in the collecting and dumping of debris with the use of debris boxes and, more particularly, to a vehicle for picking up, hauling and unloading debris boxes.

BACKGROUND OF THE INVENTION

Debris or trash boxes have been used for a number of years to collect debris from the demolition and renovation of buildings. Such debris boxes have open tops for receiving debris, and the boxes are made of heavy duty sheet metal to withstand hard use and abuse when the boxes receive and carry heavy loads, such as concrete chunks and the like. Typically, a trash box of conventional design is carried on the flat bed of a vehicle or truck and is pulled onto and off the truck bed by cable, the bed having rollers for supporting the box and for minimizing the friction between the bed and the box.

The present technique for placing the boxes on the bed of the vehicle and for taking the boxes off the vehicle is time consuming and requires several workmen to control the movement of the trash box onto and off the bed. Also, there is some measure of danger to the workmen as they try to control the movement of a trash box as it is placed onto or taken off the vehicle bed. Furthermore, full trash boxes cannot be readily retrieved or replaced when such trash boxes are in relatively inaccessible spaces, such as on a street between a pair of parked automobiles adjacent to a curb.

These drawbacks give rise to the need for improvements in the loading, carrying and unloading of trash boxes with a hauling vehicle. The present invention is directed to providing such improvements.

SUMMARY OF THE INVENTION

The present invention is directed to a vehicle having a flat bed for hauling or carrying a stack of open-top trash boxes. The vehicle also has a boom which can rotate about a vertical axis through an angle of 360°, and the boom is made up of relatively shiftable segments so that the boom can articulate so as to change the effective reach of the boom from a minimum effective length to a maximum effective length. The outer end of the boom has a jaw structure to grasp a trash box at the center portion thereof to lift it off the stack of trash boxes on the bed or to place a trash box on the bed or on the topmost trash box of the stack.

The boom can move a trash box from the stack to position in a space of limited access, such as on a street between two parked automobiles adjacent to the curb of the street. Articulation of the boom permits the boom to be of minimum reach or length for moving an empty trash box off the vehicle bed and placing the empty box on the street in a standby location. Then, the boom can be moved to a position on the street overlying a full trash box, can lift and carry the full trash box to a position on the vehicle bed, following which the empty trash box at the standby location can be lifted and placed in the position previously occupied by the full trash box. All of this can be accomplished by a single person operating the boom so as to minimize labor costs and to minimize the time required to replace a full box with an empty box.

The jaw structure can be carried on the vehicle in a stored condition near the rear end of the vehicle bed. Thus, the jaw structure, when not in use, will be effectively stored in a minimum of space and out of the way to avoid interfering with the operation of the vehicle as the vehicle moves along a street or roadway.

The primary object of the present invention is to provide an improved vehicle for carrying trash boxes in a stack on the bed of the vehicle wherein the vehicle has a boom and jaw structure on the boom which can be moved to manipulate the trash boxes carried by the vehicle, so that the trash boxes can be quickly and easily unloaded at a job site and full boxes can be picked up and hauled to a dump site, all of which can be accomplished by a single workman in a minimum of time.

Another object of the present invention is to provide a vehicle of the type described wherein the operation of the vehicle allows for the pickup of trash boxes from and the placement of trash boxes in confined spaces which cannot be reached with the operation of conventional equipment.

Other objects of this invention will become apparent as the following specification progresses, reference being had to the accompanying drawings for an illustration of the invention.

DESCRIPTION OF THE DRAWINGS

FIG. 8 is a top plan, schematic view of the vehicle, showing the way in which a debris box from the bed of the vehicle is put into place on a street adjacent to a curb and between a pair of parked vehicles;

FIG. 9 is a view similar to FIG. 8, but showing the way in which the debris box is placed adjacent to side of an alley or driveway;

DETAILED DESCRIPTION

Figure 1:
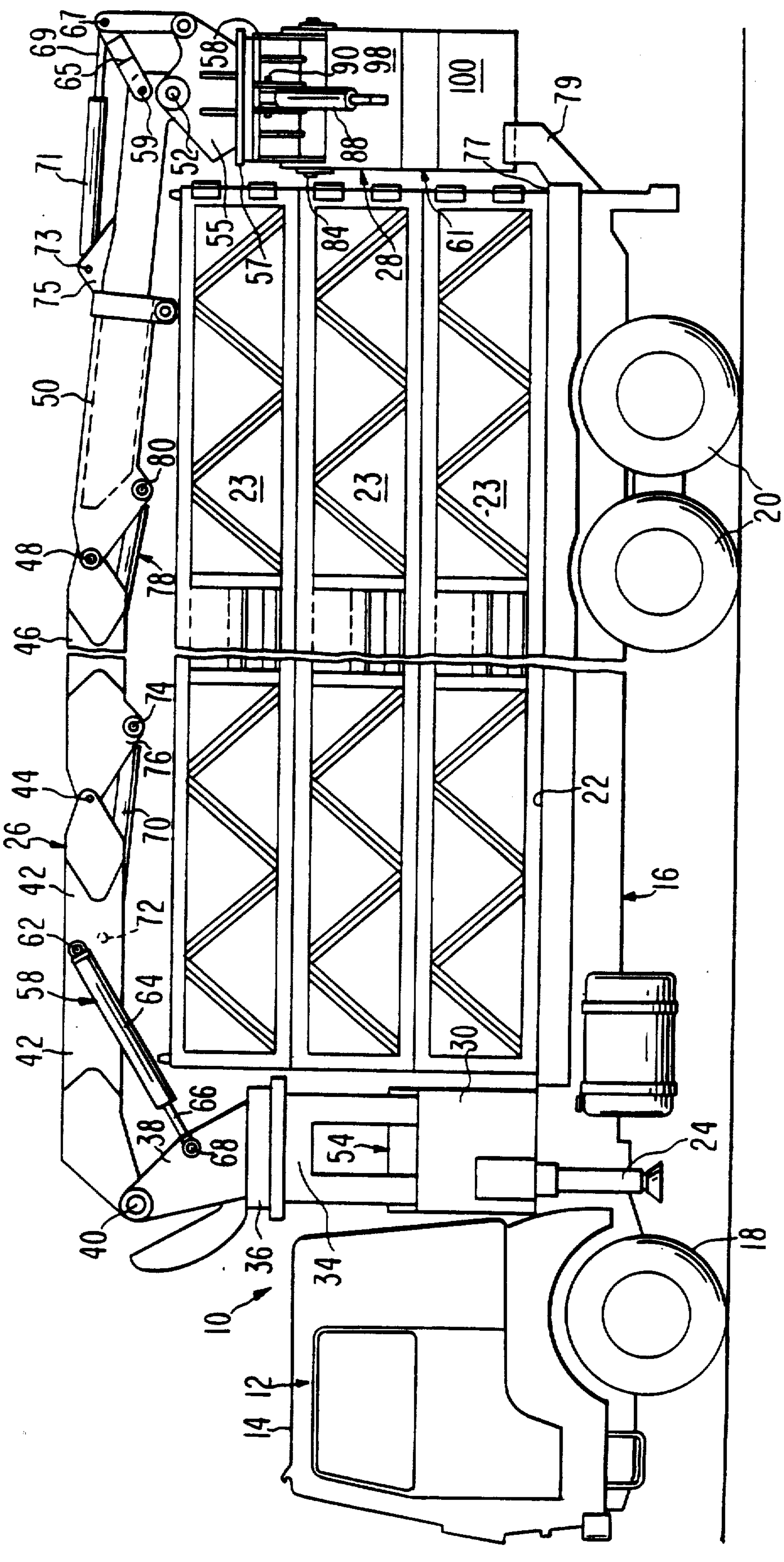
FIG. 1 is a side elevational view of the vehicle of the present invention, showing the way in which three debris or trash boxes are stacked on the bed of the truck beneath the boom pivotally mounted near the front end of the vehicle.
Figure 2:
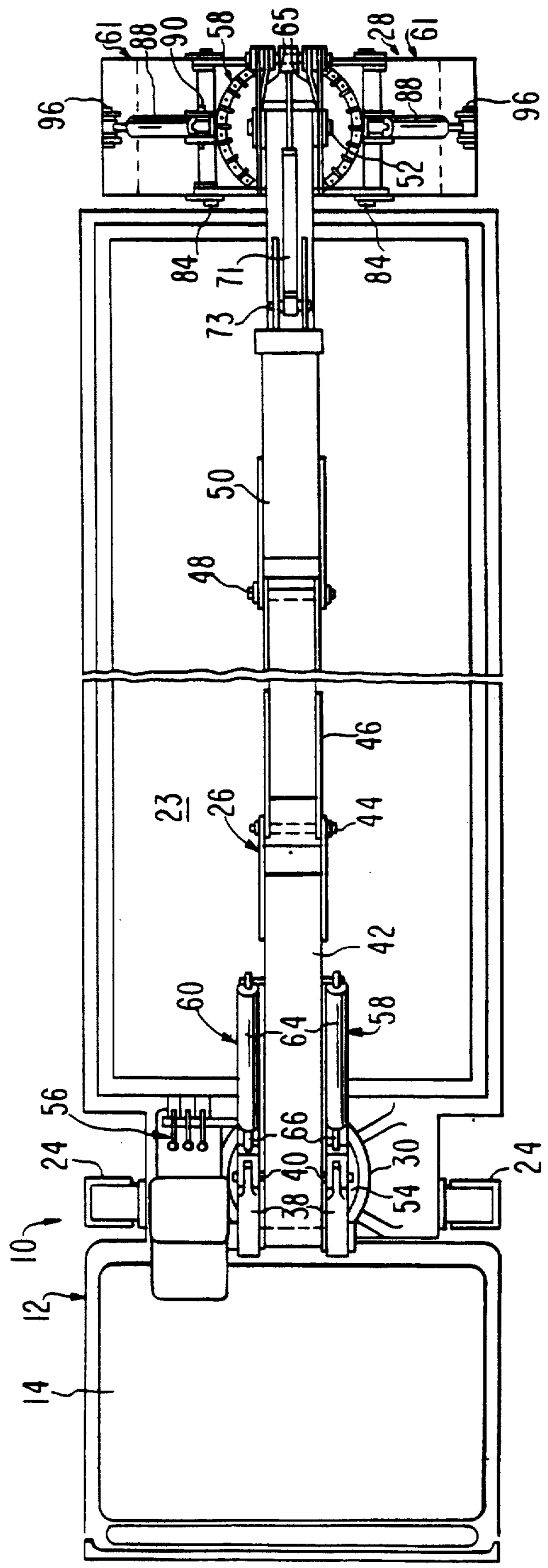
FIG. 2 is a top plan view of the vehicle of FIG. 1, showing the open top of the uppermost trash box on the bed of the vehicle.
Figure 3:
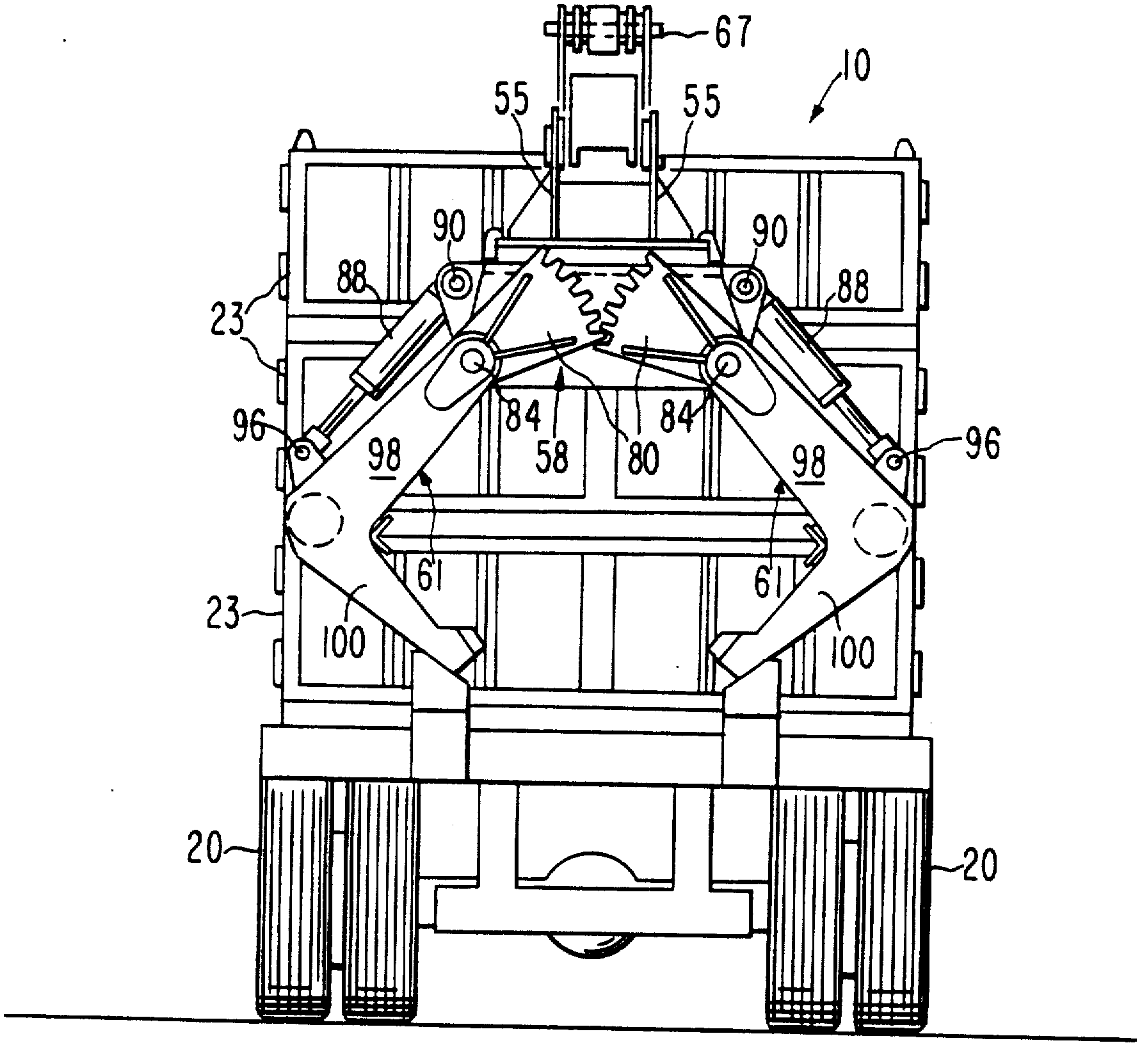
FIG. 3 is a rear elevational view of the vehicle of FIG. 1, showing the jaws on the rear end of the boom for raising and lowering the trash boxes on the bed of the vehicle.

The apparatus of the present invention for carrying trash boxes 23 is broadly denoted by the numeral 10 and is shown in FIGS. 1-3. Apparatus 10 includes a vehicle 12 having a cab 14 mounted on the front end of a frame 16, the frame being provided with a set of front wheels 18 and one or more sets of rear wheels 20 as shown in FIG. 1. Bed 16 has an upper, flat surface 22 for supporting trash boxes in stacked relationship on the bed. A hydraulic jack 24 may be provided to stabilize vehicle 12 when the trash boxes are being unloaded from or loaded onto the bed 16.

An elongated, shiftable boom 26 is mounted on vehicle 12 for providing a support for jaw means 28 at one end of the boom so that the jaw means can be operated to grasp the sides of one of the boxes 23 to raise and lower the box with respect to the bed of the truck.

A stationary, tubular post 30 (FIG. 1) is mounted on the frame 16 of the vehicle 12 at the rear of the cab 14. A turret member 34 of conventional design is rotatably received within post 30 and extends upwardly from the open upper end thereof. Turret member 34 has an upper part 36 for supporting a pair of upstanding arms 38 which are rigid to and extend upwardly from upper part 36.

One end of boom 26 is pivotally mounted by pivot pin 40 on the upper ends of arms 38. Specifically, this part of the boom 26, namely, segment 42, extends outwardly from arms 38 while the opposite end of segment 42 is coupled by pivot pin 44 to one end of a second boom segment 46. A pivot pin 48 couples the opposite end of boom segment 46 to a boom segment 50 whose opposite end is pivotally coupled by pivot pins 52 to jaw means 28 for a purpose hereinafter described.

Turret member 34 is rotatably mounted on post 30 by any suitable structure 54 of conventional design, (FIG. 1), such as a rack and pinion assembly or a hydraulic piston and cylinder assembly, both of which are available commercially and operable from a remote control station such as control station 56 (FIG. 2) adjacent to post 30 and to one side of the post. The moving means 54 allows 360° rotation in either direction of turret member 34 relative to post 30.

A pair of fluid piston and cylinder assemblies 58 and 60 are provided for boom segment 42 to raise and lower the segment relative to turret member 34. To this end, each of assemblies 58 and 60 includes a pivot pin 62 for pivotally coupling one end of cylinder 64 to boom segment 42. A piston 66 extending outwardly from the cylinder 64 is pivotally mounted by a pin 68 to the adjacent arm 38. Thus, to raise the boom, piston 66 is forced outwardly of its cylinder 64; conversely, to lower the boom, piston 66 is moved into the corresponding cylinder 64.

Boom segment 46 is movable about pin 44 relative to boom segment 42 and is shiftable relative to boom segment 50 about pin 48. To pivot boom segment 46 relative to boom segment 42, a fluid piston cylinder assembly 70 is provided, one end of the assembly being coupled to boom segment 52 by a pin 72, and the opposite end of the assembly 70 being coupled by a pin 74 to a projection 76 on the adjacent end of boom segment 46. Similarly, fluid piston cylinder assembly 78 is pivotally connected at the ends thereof to boom segment 46 and to a projection on boom segment 50, the latter pivotal connection being accomplished by means of a pivot pin 80 (FIG. 1).

Boom segment 50 has an outer end pivotally coupled by pins 52 to a pair of legs 55 which are on the upper part 57 of rotatable turret assembly 58 which carries jaw means 28. Thus, by virtue of turret assembly 58, the jaw means 28 which include a pair of jaws 61 (FIGS. 2 and 3) can rotate about a central axis through the turret assembly 58.

An arm 65 near pin 52 is pivotally coupled by a pin 59 to the rear end of boom segment 50, and pin 67 couples the outer end of arm 65 to the outer end of a piston 69 of a fluid piston cylinder assembly 71 which is pivotally mounted by means of pin 73 on projection 75 on boom segment 50. Thus, by actuation of piston and cylinder assembly 71, arms 55 and thereby jaw means 28 and turret assembly 58 can pivot about the axes of pins 52 so that the jaw means can be swung outwardly of the rear end 77 (FIG. 1) of the bed 16. The bed is provided with supports 79 extending upwardly and rearwardly from the bed as shown in FIG. 1 to support the arms or jaws 60 and 62 in a manner shown in FIG. 3 when the jaws are in their stored positions as shown in FIG. 3.

Each of jaws 61 has a gear link 80 at the upper end thereof. Links 80 have their teeth 82 in mesh with each other. Moreover, jaws 61 are coupled by respective pins 84 and 86 to the turret assembly 58 shown in FIG. 3 so that the jaws can rotate about the axes of pins 84 and 86 relative to turret assembly 58.

A fluid piston cylinder assembly 88 is provided for each jaw 61, respectively. One end of assembly 88 is pivotally coupled by a pin 90 to an ear 92 which is rigidly secured to turret assembly 58. The opposite end of the piston 94 of assembly 88 is pivotally coupled by a pin 96 to the jaw 61 midway between the ends thereof, the jaw having a first leg 98 and a second leg 100 integral with each other and substantially at right angles with respect thereto. Thus, by actuation of piston and cylinder assemblies 88, jaws 61 are caused to rotate about their respective pivot axes 84 relative to turret assembly 58. FIG. 3 shows the at-rest or stored position of jaws 61; whereas, FIG. 5 shows the jaws 61 in the operative positions embracing the side walls of a debris box 23 as hereinafter described.

Each of debris boxes 23 is typically of a length sufficient to fit on the upper surface of bed 16. Each box has a pair of opposed side walls 25 (FIG. 5) which have center sections 27 which are reinforced and which present a transversely V-shaped notch 29. Each jaw 60 has its outer leg 100 (FIGS. 3 and 5) which is plate-like in nature as shown in FIG. 1. The outer end of leg 100 is provided with a lateral projection 31 which is received within notch 29 so that the projection 31 presents a shoulder on which the side wall 25 is supported. Projection 31 has a surface which is complemental to the upper portion of the means defining notch 29 as shown in FIG. 5. The remainder of leg 100 extends along the outer surface of side wall 25 and out of contact with the same, and the junction between legs 98 and 100 has a transversely L-shaped pad 33 (FIG. 5) which rests on the top bar 35 of side wall center section 27 as shown in FIG. 5.

Figure 5:
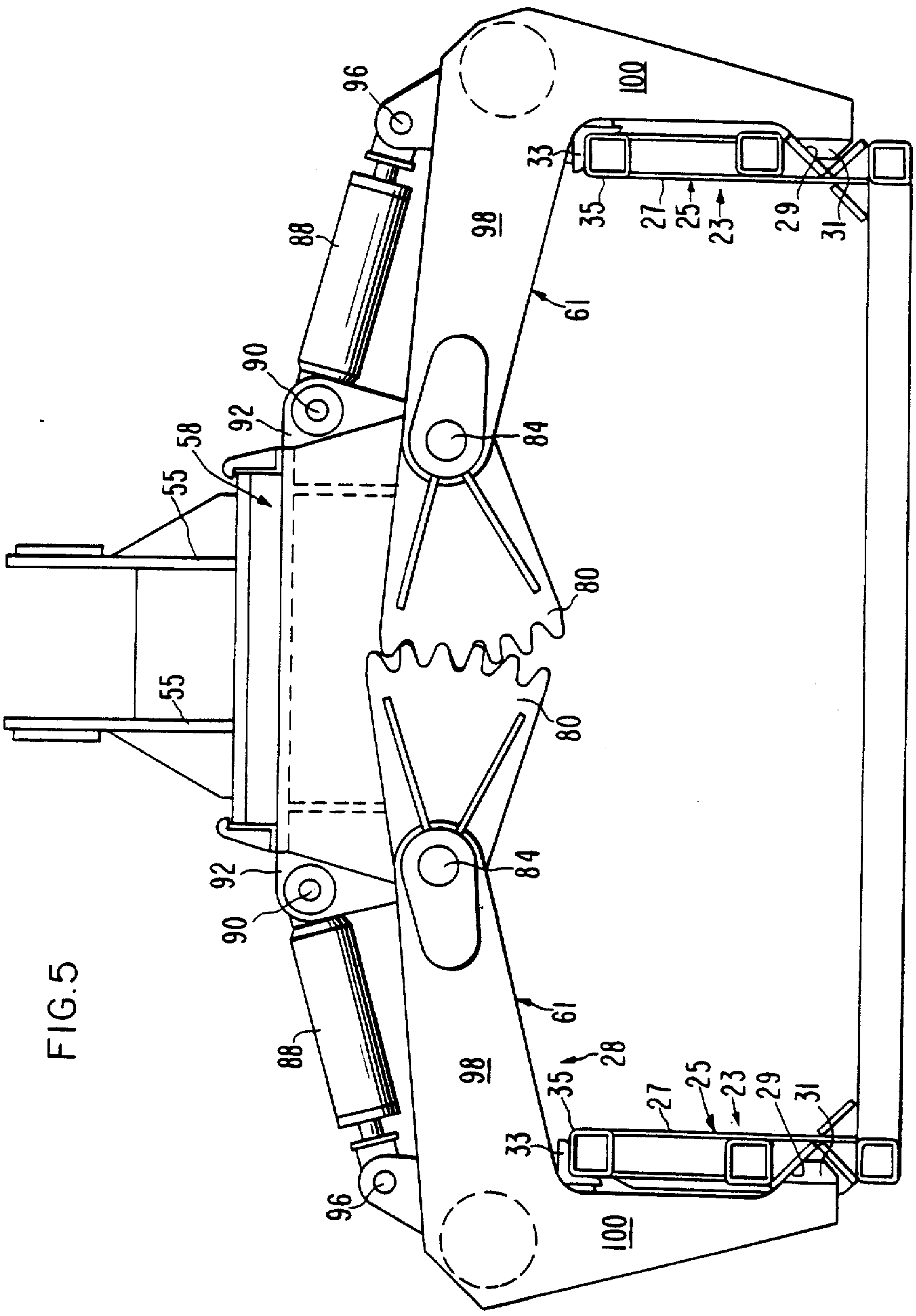
FIG. 5 is a rear elevational view of the jaws in their open position straddling the side walls of a debris box for raising or lowering the box relative to the bed of the vehicle.

With jaws 61 in the operative position of FIG. 5, a trash or debris box 23 can be lifted off the bed 16 or placed on the bed. The lifting action is accomplished when jaw means 28 is swung outwardly and away from the rear ends of trash boxes 23 as shown in FIG. 1 and then by actuation of piston cylinder assembly 64 (FIG. 1) to raise boom 26 after the boom has been shortened in length by the articulation of boom segments 42, 46 and 50. Since turret assembly 58 allows rotation of jaws 28, apparatus 10 can be operated such that each of trash boxes 23 can be manipulated one by one and placed in tight spots such as between parked automobiles along a curb.

As shown in FIG. 1, three debris or trash boxes 23 are mounted on bed 16 in stacked relationship. A typical debris capacity for each trash box 23 is 13 cubic yards with the three boxes being able to carry a total load of approximately 4000 pounds.

Figure 4:
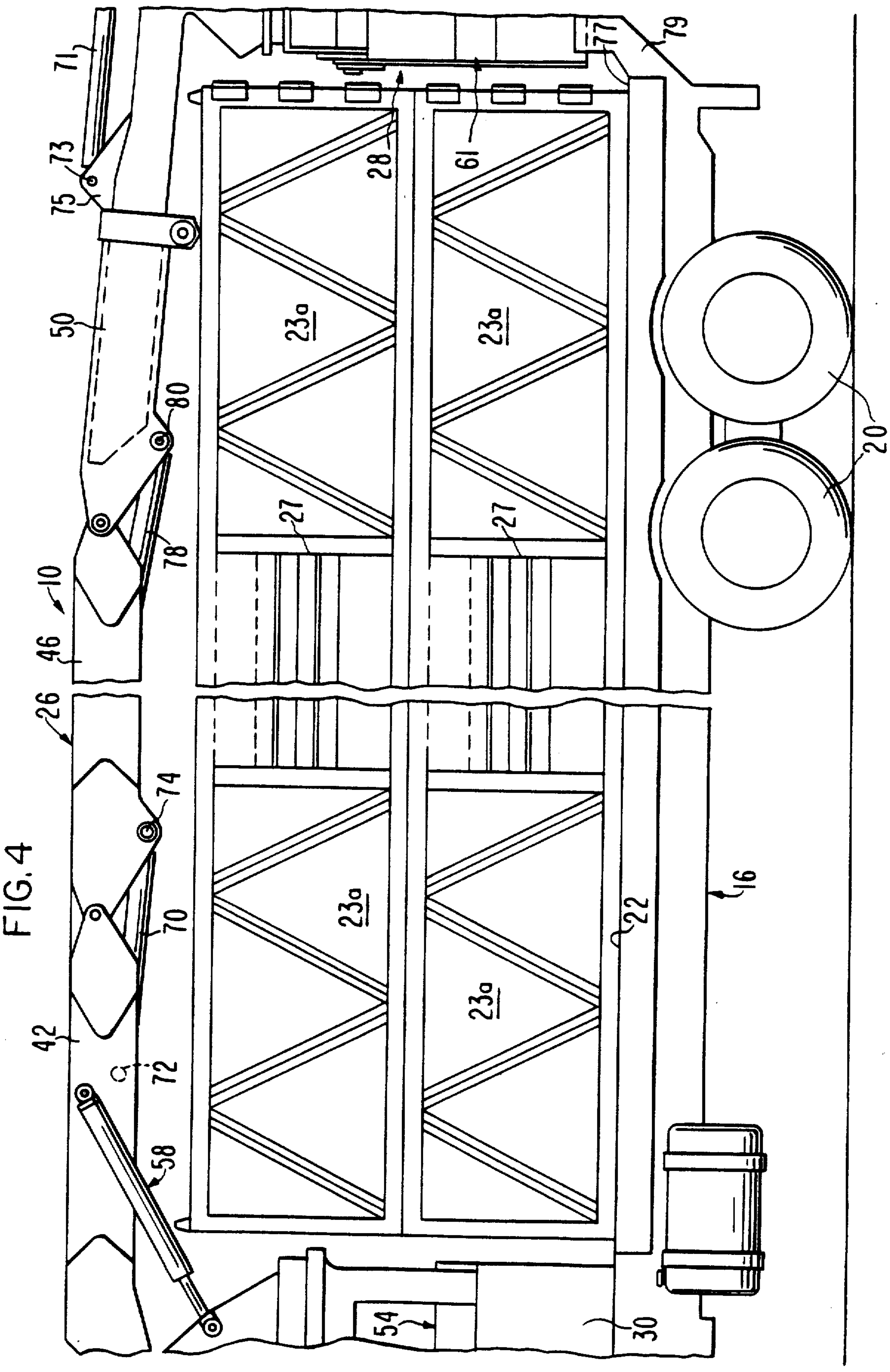
FIG. 4 is a view similar to FIG. 1, but showing a different arrangement of the debris or trash boxes on the bed of the vehicle.

FIG. 4 shows a different arrangement of trash boxes in which two trash boxes 23a of a different height than each trash box 23 are provided on vehicle 12. Each trash box 23a shown in FIG. 4 typically has a capacity of 20 cubic yards of debris, and both boxes together carry a maximum load of 4000 pounds of debris.

Figure 6:
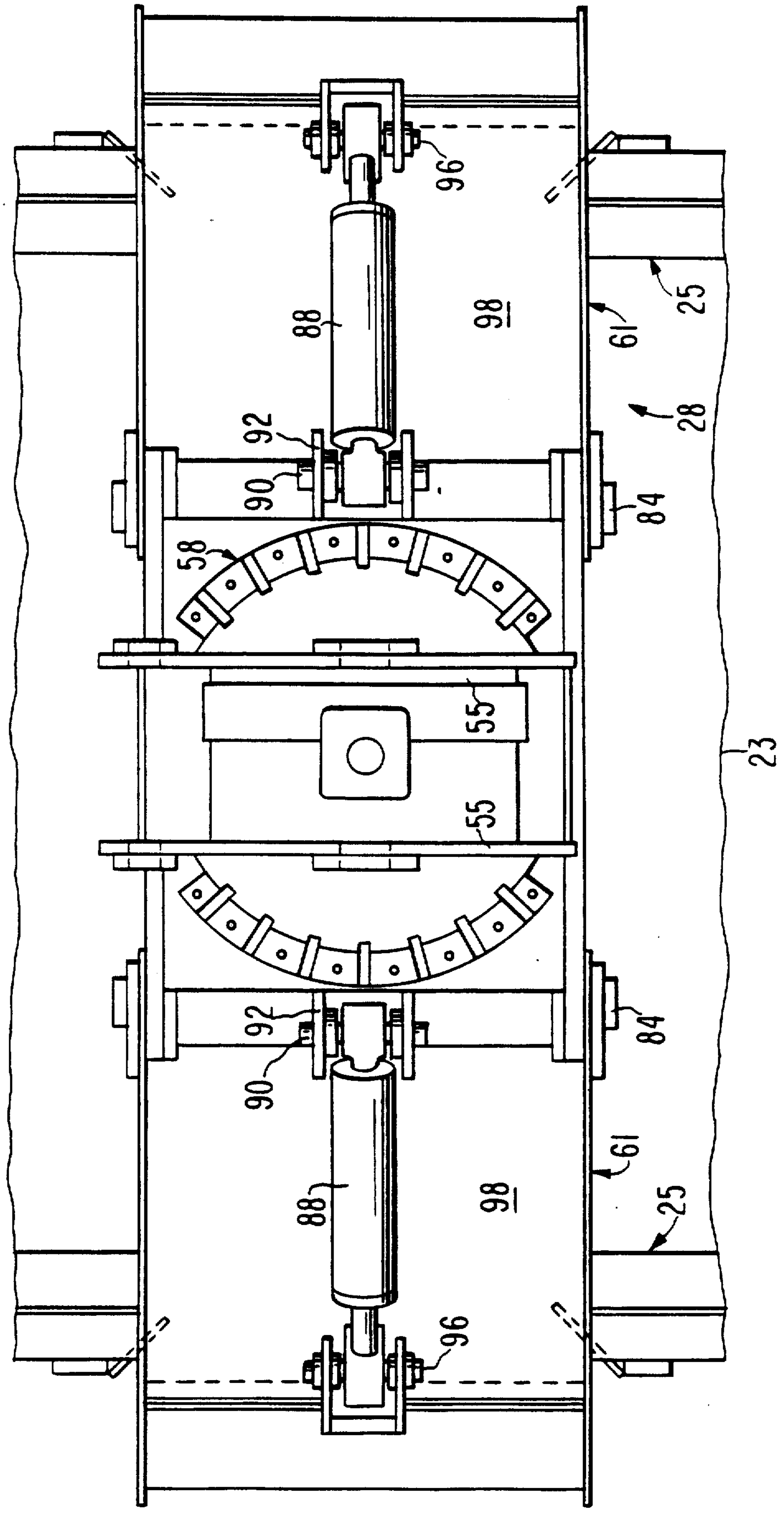
FIG. 6 is a top plan view of the rear end of the boom with the jaws in their open position of FIG. 5.
Figure 7:
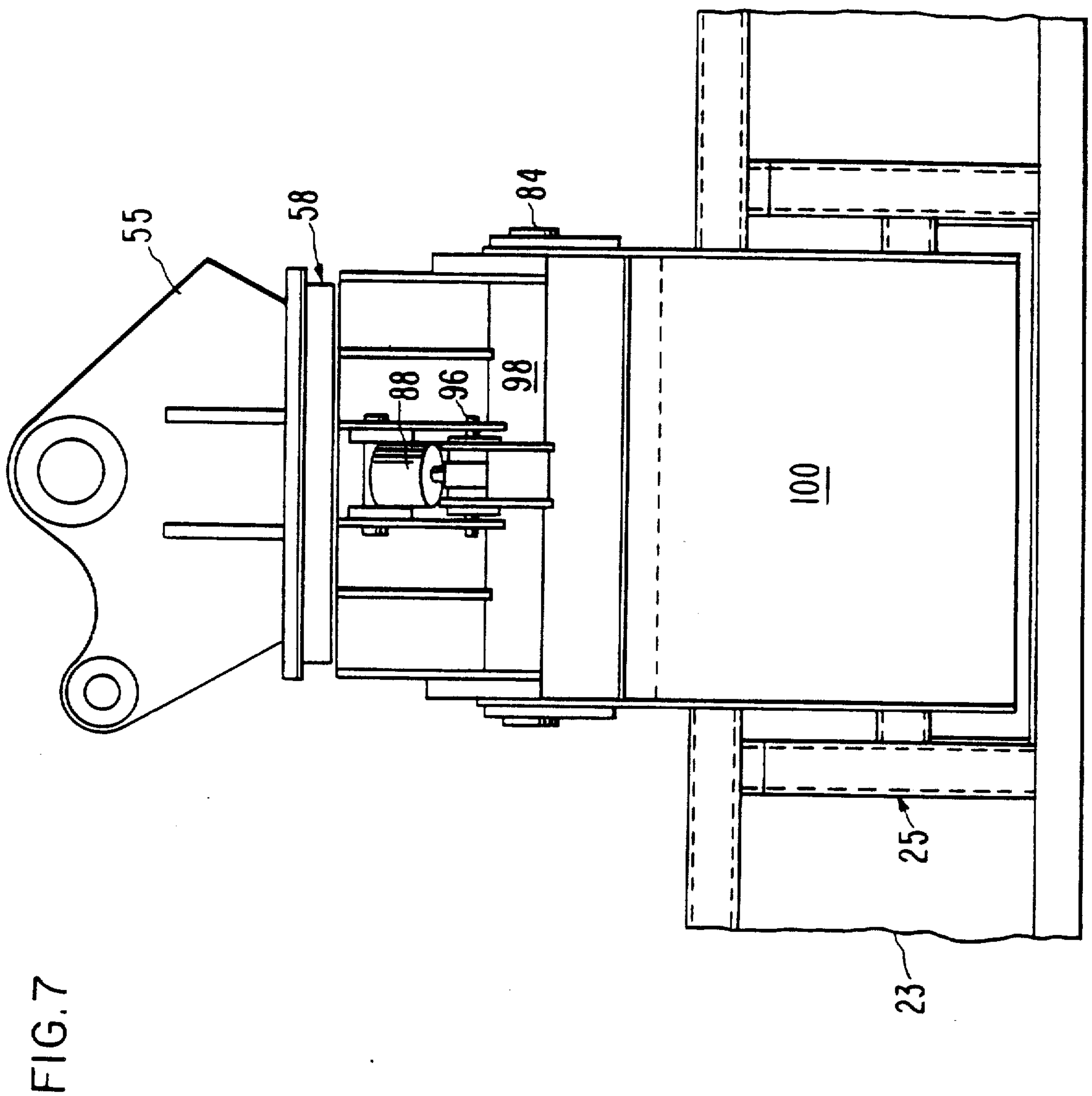
FIG. 7 is a side elevational view of one of the jaws when it is outboard of the adjacent debris or trash box.

FIGS. 1 and 3 show three debris or trash boxes 23 mounted on bed 16. FIG. 4 shows two boxes 23a on the bed. FIGS. 6 and 7 show various positions of the jaws 61 when the jaws are on opposite sides of the side wall of a trash box 23.

Figure 10:
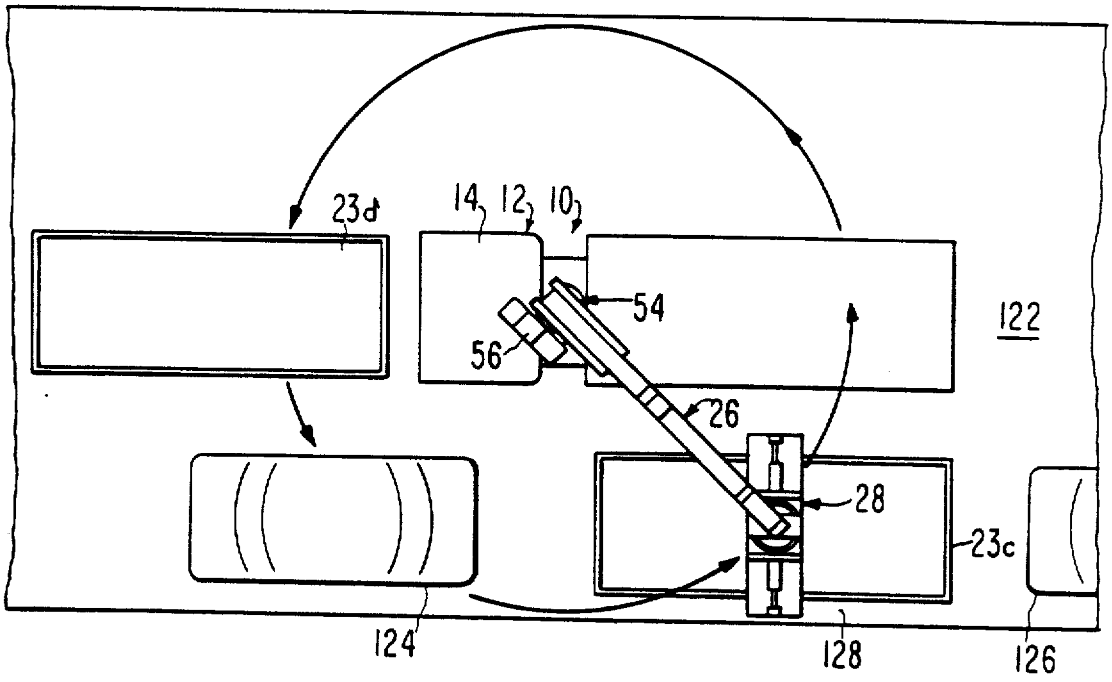
FIG. 10 is a view similar to FIGS. 8 and 9, but showing the way in which a debris box in a full condition is removed from a position adjacent to the curb between a pair of parked vehicles, and is lifted onto the bed of the vehicle as an empty debris box is about to be put into place of the full box.

FIGS. 8-10 show several examples of how apparatus 10 of the present invention operates. For example, in FIG. 8, the vehicle 10 is parked adjacent to and parallel with a pair of parked vehicles 110 and 112 adjacent to a curb 114 of a street 116. Assuming that a full box 23c is in the space between parked vehicles 110 and 112, it is desired to replace the full debris box 23c with an empty box 23d, the latter box being carried by the bed 16 of vehicle 12.

The first step is to lift the empty box 23d off bed 16 and place it at a location forwardly of cab 14 of vehicle 12. This is done by having the jaws 61 embrace and engage the side wall of the empty box 23d in the manner disclosed in FIG. 5, whereupon the boom 26 will be of the proper length to grasp empty box 23d and lift it and swing it in a direction of arc 118 (FIG. 8). At the front of the vehicle, the box is lowered onto the surface of the street.

The next step is for the boom to be swung about its vertical axis of turret means assembly 58 over the full box 23c as shown in FIG. 8. The jaws 60 remain open and are slightly closed in embracing relationship to the sides of the full box 23c in the manner shown in FIG. 5. Then, the full box is lifted, moved and placed on bed 16 of vehicle 12.

The next step is to swing the boom in a counterclockwise, or clockwise sense when viewing FIG. 8, until the boom and jaws are positioned so that the jaws can pick up empty box 23d. When picked up, the box is swung over to the space previously occupied by the full box 23c, and the empty box is lowered onto the surface of the street and is placed between vehicles 110 and 112. Then, the vehicle with the full box 23c on bed 16 moves away to a dump site.

In a second example shown in FIG. 9, a full box 23c is in an alley or deep driveway 120, and the full box is to be replaced with an empty box. The vehicle 12 is driven into the alley or deep driveway, following which the first step is to deposit the empty box 23d on the surface of the alley or deep driveway ahead of the vehicle as shown in dashed lines in FIG. 9. Then, boom 26 is moved so that the jaws 60 can embrace the central portion of full box 23c so that the jaws can engage the sides of the box and lift it and swing it to a position overlying bed 16, following which the box is lowered onto the bed.

The next step is for the boom to be pivoted such that it can lift empty box 23d into the position previously occupied by the full box 23c. Following this, the boom is retracted into its stored position shown in FIG. 1, and the vehicle can be moved out of the alley or deep driveway to another job site or to a dump site.

FIG. 10 shows a one-way alley 122 in which parked vehicles 124 and 126 are parked on opposite sides of a space 128 occupied by a full box 23c. The vehicle 12 is driven up to a position adjacent to and outwardly of space 128, following Which an empty trash box 23d is taken off the bed 16 of the vehicle and placed in advance of the cab 14 of the vehicle 12. Then, the boom is swung into a position overlying full box 23c, the boom picks the box 23c up and places it on a bed 16, following which the boom swings in a counterclockwise sense to a position overlying empty box 23d, following which the boom picks the empty box up and places it at space 128 between parked vehicles 124 and 126. Then, the vehicle 12 drives away with the full box 23c to another job site or to a dump site.

Figure 11:
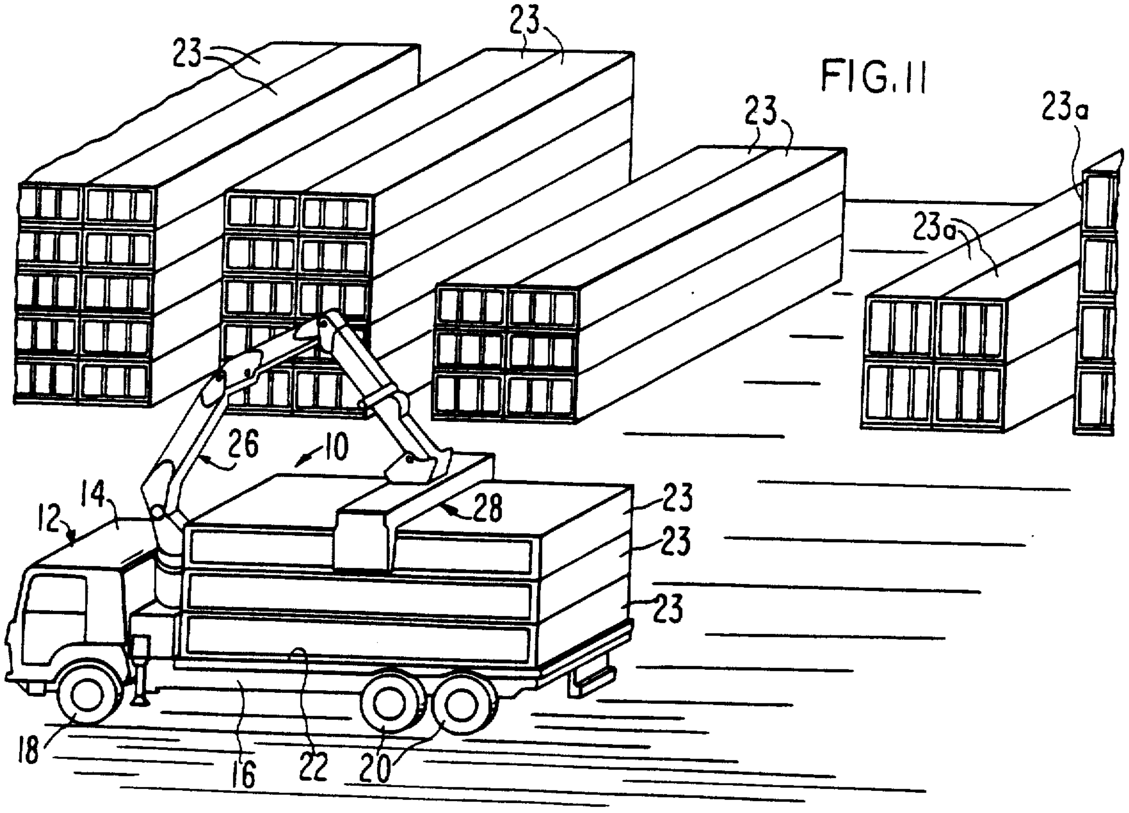
FIG. 11 is a perspective, schematic view of a plurality of debris or trash boxes, showing the way in which boxes of equal volume are stacked for storage.

FIG. 11 shows the way in which boxes 23 and 23a can be stored. For instance, boxes 23 (the 13-cubic-yard boxes) can be stacked five high and two side by side with each other. FIG. 11 shows a total of ten boxes 23 in two adjacent stacks, in a short stack of six boxes, two side by side. FIG. 11 further shows the stacking of boxes 23a as being four high and two wide. FIG. 11 further shows vehicle 12 adjacent to the storage area of the boxes 23 and 23a, with the boom 26 on the vehicle articulated so that the topmost box 23 on the bed 16 of vehicle 12 is about to be lifted off the vehicle. To achieve this, boom 26 needs to be articulated as shown in FIG. 11, and this can be achieved to shorten or lengthen the reach of the boom so that jaws 60 can be positioned to engage the sides of a box on the bed of the truck as well as to extend the box to a storage position or to an operative space as shown in FIGS. 8-10.

By providing boom 26 with pivotal segments 42, 46 and 50 (FIG. 1) the reach, i.e., the effective length can be changed from a maximum reach shown in FIG. 1 to a minimum reach. The boom has a reduced reach as shown in FIG. 11 but the reach can be reduced further from that shown in FIG. 11, if desired.

We claim:

1. Apparatus for carrying a trash box comprising:

a vehicle having a bed;

a boom;

means for pivotally mounting one end of the boom on the bed for a rotation about a vertical axis, said boom including a number of pivotally interconnected segments to allow the boom to articulate and to change the reach of the boom, and means coupled with the segments for causing articulation of the boom;

jaw means for grasping the sides of a trash box and for lifting the trash box to move it onto or off the bed, said jaw means including a pair of substantially I-shaped jaws, means for pivotally mounting the jaws intermediate the ends thereof on the boom, each of said jaws having an upper end with gear structure thereon, the gear structures of the jaws being in mesh with each other, whereby pivotal movement of one jaw will cause pivotal movement of the other jaw through the same angle and means coupled with each jaw, respectively, for pivoting the jaw relative to the boom.

2. Apparatus as set forth in claim 1, wherein said boom mounting means includes a generally upright, tubular post secured to the vehicle, and turret structure rotatably mounted on the post, said turret structure being coupled with the boom to rotate the boom about said vertical axis in opposed direction relative to the bed of the vehicle.

3. Apparatus as set forth in claim 1, wherein said jaw mounting means includes a turret assembly coupled to the opposite end of the boom and being rotatable relative thereto through an angle of approximately 360°.

4. Apparatus as set forth in claim 1, wherein each jaw has an outer end, the outer ends of the jaws having projections thereon for presenting shoulders for engaging and supporting side wall surface portions of a trash box to be lifted and moved by the boom.

5. Apparatus as set forth in claim 1, wherein is included an open-top trash box for placement on the bed of the vehicle, said box having a pair of side walls, and means on the side walls for presenting inclined surface portions engageable by said jaw means when the box is to be moved onto or off the bed.

6. Apparatus as set forth in claim 5, wherein the outer end of each jaw has a projection thereon for underlying a surface portion of the respective side of the box.

7. Apparatus as set forth in claim 1, wherein is included a plurality of open-top trash boxes stacked on said bed.

* * * * *